(12) United States Patent
Teeraparpwong et al.

(10) Patent No.: US 8,812,658 B1
(45) Date of Patent: Aug. 19, 2014

(54) PRE-FETCHING OF NETWORK PAGE CONTENT

(75) Inventors: Pongsakorn Teeraparpwong, Bellevue, WA (US); Sikandar Saifullah, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 153 days.

(21) Appl. No.: 13/112,545

(22) Filed: May 20, 2011

(51) Int. Cl.
G06F 15/173 (2006.01)
G06F 15/177 (2006.01)

(52) U.S. Cl.
USPC .......................... 709/224; 709/203

(58) Field of Classification Search
CPC ........................................ G06F 15/30
USPC ........................ 709/203, 223–226
See application file for complete search history.

(56) References Cited

U.S. PATENT DOCUMENTS

| | | | | |
|---|---|---|---|---|
| 6,085,226 A * | 7/2000 | Horvitz | ......................... | 709/203 |
| 6,237,039 B1 * | 5/2001 | Perlman | ....................... | 709/237 |
| 7,415,517 B1 * | 8/2008 | Schleit et al. | ................. | 709/224 |
| 7,475,089 B1 * | 1/2009 | Geddes | .............................. | 1/1 |
| 7,757,298 B2 * | 7/2010 | Shuster | .......................... | 726/30 |
| 8,230,046 B2 * | 7/2012 | Jiang | ............................. | 709/219 |
| 2005/0228795 A1 * | 10/2005 | Shuster | .......................... | 707/10 |
| 2006/0047775 A1 * | 3/2006 | Bruck et al. | .................. | 709/217 |
| 2007/0124446 A1 * | 5/2007 | Coulthard et al. | ............ | 709/223 |
| 2008/0016218 A1 * | 1/2008 | Jones et al. | .................... | 709/226 |
| 2010/0088398 A1 * | 4/2010 | Plamondon | ................... | 709/220 |
| 2011/0145321 A1 * | 6/2011 | Jiang | ............................. | 709/203 |

* cited by examiner

Primary Examiner — Asad Nawaz
Assistant Examiner — Berhanu Belete
(74) Attorney, Agent, or Firm — Thomas | Horstemeyer, LLP

(57) ABSTRACT

Disclosed are various embodiments for pre-fetching of resources referenced on a network page. A predicted next network page is retrieved by a computer system. The predicted next network page references at least one resource. At least one attribute of the resource is evaluated according to at least one retrieval criteria. At least one resource is retrieved if the attribute meets the retrieval criteria.

21 Claims, 4 Drawing Sheets

PRE-FETCHING OF NETWORK PAGE CONTENT

BACKGROUND

Online shoppers interact with electronic commerce network sites to find products of interest and obtain information about those products. Such sites may allow users to interact with a network page in a browser in order to browse a catalog hierarchy, sort items by various criteria, perform searches using keywords, and perform various other actions. In doing so, the user accesses or views a series of pages, moving from one page to another. To view these pages, each page is retrieved, which includes layout code and any content referenced by the page.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to pre-fetching resources referenced in a network page, and more specifically, in a predicted next network page. A prediction engine is used to predict which network page will next be viewed or accessed by a user, and the browser pre-fetches portions of this network page so that the predicted next network page may be made visible to the user in immediate response to the user selecting the predicted page. In addition to the page itself, resources referenced within the page are also pre-fetched before the predicted next page is viewed by the user. Various criteria related to attributes of those resources may be used to select which resources are pre-fetched and/or to set the order of the pre-fetching. In this manner, the network page and the resources referenced therein may be rendered by the browser in immediate response to the user choosing the predicted page.

Figure 1:
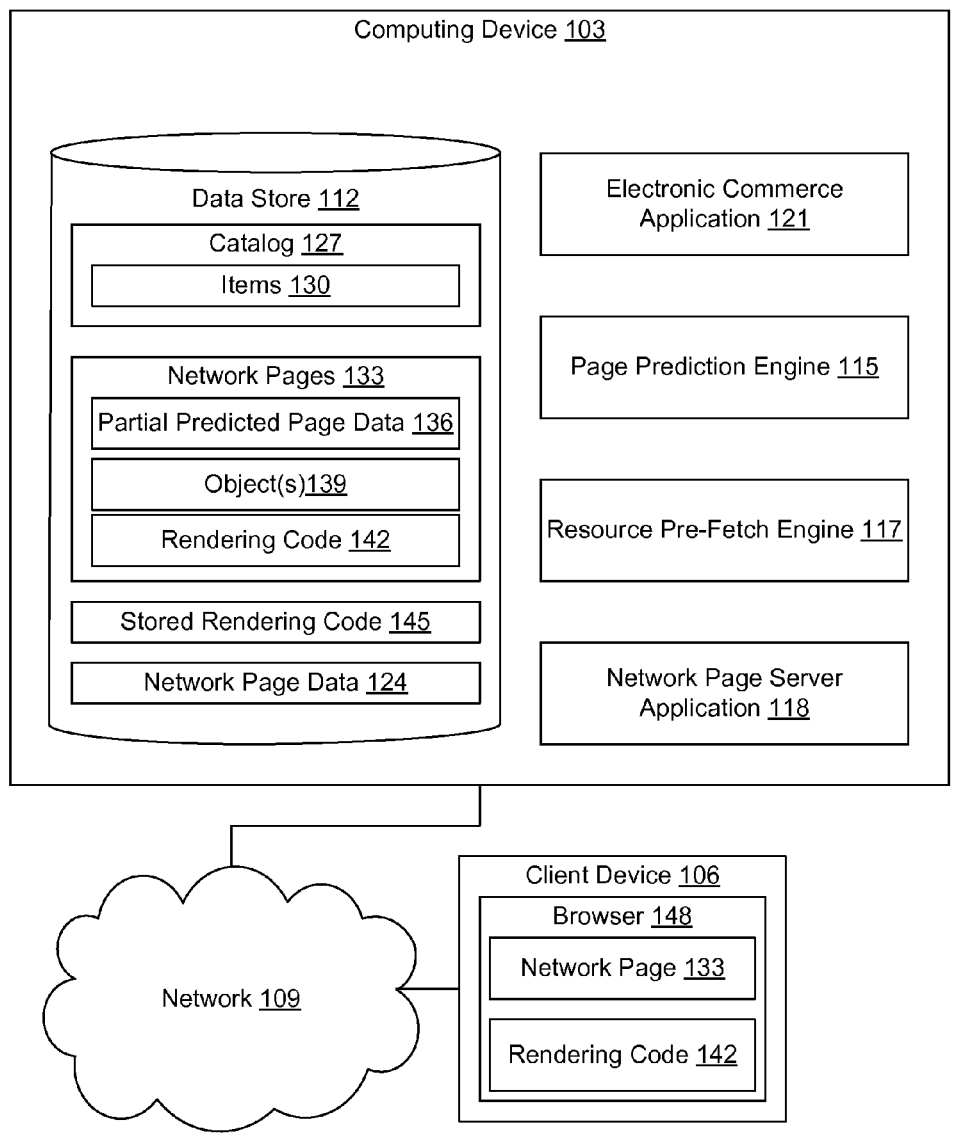
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a page prediction engine 115, a resource pre-fetch engine 117, and a network page server application 118. In some embodiments, the computing device 103 also includes an electronic commerce application 121. The components executed on the computing device 103 may also include other applications, services, processes, systems, engines, or functionality not discussed in detail herein. These components may communicate with each other using various mechanisms, including but not limited to any type of middleware framework. Though shown as logically separate components, the functionality of the page prediction engine 115, the network page server application 118, and the electronic commerce application 121 can be combined and/or distributed in various ways, as can be appreciated.

The data stored in the data store 112 includes, for example, network page data 124, a catalog 127 of items 130, and potentially other data. As used herein, the term "item" 130 may refer to a product, good, service, software download, multimedia download, social networking profile, or other item 130 that may be offered for sale, purchase, rental, lease, download, and/or any other form of consumption, as may be appreciated. Associated with items 130 and stored in catalog 127 are data such as titles, descriptions, keywords, metadata, weights, customer reviews, multimedia, and other data relating to the items 130. The catalog 127 may be arranged in a hierarchical manner, with categories and subcategories.

The optional electronic commerce application 121, if present, is executed in order to facilitate the online viewing and/or purchase of items and products over the network 109. The electronic commerce application 121 also performs various backend functions associated with the online presence of a merchant in order to facilitate the online purchase of items, as should be appreciated. In embodiments which include the electronic commerce application 121, the catalog of items comprises a product catalog of items offered for sale so that data associated with items 130 comprises product data.

The network page server application 118 is executed to generate network pages 133 that describe items. To this end, the network page server application 118 uses network page data 124, which may include any type of data related to the generation of network pages 133. Such data may include, for example, templates, executable code, interpreted code, hypertext markup language (HTML), extensible markup language (XML), images, video, text, graphics, and any other type of data that may be used in network pages 133. The network page server application 118 may comprise a commercially available hypertext transfer protocol (HTTP) server such as, for example, Apache® HTTP Server, Microsoft® Internet Information Services (IIS), and other servers.

The page prediction engine 115 may improve rendering at the client by making a prediction as to which network page 133 a user will select next, and generating a predicted next network page 133 that includes partial predicted page data 136. The prediction techniques used by the page prediction engine 115 may include, for example, those described in commonly assigned applications having Ser. Nos. 13/037,829, 13/037,837, 13/037,842, 13/037,852, and 13/037,857, all of which were filed on Mar. 1, 2011, and each of which is hereby incorporated by reference herein.

The network page 133 may include rendering code 142. The network page 133 with the partial predicted page data 136 and the rendering code 142 is provided to the client device 106, which allows the browser 148 to render more quickly a portion of the predicted page and the resources 139 referenced therein, before the user actually takes the action which leads to the page. In some embodiments, the partial predicted page data 136 corresponds to the portion of the predicted network page 133 that is first seen by the user, a region sometimes referred to as "above the fold."

A network page 133 may include references or links to resources 139, which may be stored in files separate from the network page 133. The resources 139 may be media resources such as graphics, audio, video, and multimedia. The resources 139 may also be code resources such as executable code or scripting code. The resource pre-fetch engine operates to select and/or prioritize resources 139 for pre-fetching, and to provide a list of the resources for pre-fetch to the browser 148 executing on the client device 106. The browser 148 then retrieves one or more of the listed resources from the network page server application 118. This retrieval can be performed before the user views the network page 133, so that the pre-fetch resources 139 are immediately available to the user without a delay.

The network page server application 118 may be configured to generate the partial predicted page data 136 for a specific network page 133 and/or client device 106 based on stored rendering code 145 in the data store 112. The stored rendering code 145 may include, for example, JavaScript, dynamic HTML (DHTML), Ajax, and any other type of code that may be executed in a client device 106 from within a network page 133. The stored rendering code 145 may also include asynchronous exchange of data with the page prediction engine 115, the network page server application 118, or other applications using Ajax, simple object access protocol (SOAP), remote procedure call (RPC), and/or other technologies.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 148 and other applications. The browser 148 may be executed in a client device 106, for example, to access and render network pages 133 or other network content served up by the network page server application 118, thereby generating a rendered network page. The rendering code 142 included within a predicted next network page 133 may be executed in the context of the browser 148. The client device 106 may be configured to execute applications beyond the browser 148 such as, for example, email applications, instant message applications, and/or other applications.

A general description of the operation of the various components of the networked environment 100 is provided. To begin, the browser 148 requests a network page 133 from the network page server application 118. In response, the network page server application 118 provides the requested network page 133 as well as at least a portion of a predicted next network page, in the form of partial predicted page data 136. The predicted next network page 133 includes references to one or more resources 139, which are stored separately from the predicted next network page 133, and thus must be retrieved before viewing by the user. The resource pre-fetch engine 117 uses selection and/or prioritization criteria related to attributes of the referenced resources 139 to determine which of the resources 139 on the predicted next network page 133 are to be pre-fetched by the browser 148, and/or to determine a recommended order in which the resources 139 should be pre-fetched. The resource pre-fetch engine 117 then provides the list of resources 139 for pre-fetch to the browser 148.

The browser 148 then pre-fetches the listed resources in the order dictated by the resource pre-fetch engine 117, before the user has selected the predicted next network page described by the partial predicted page data 136. Thus, when the user does access the predicted next network page, not only the page itself but one or more referenced resources 139 are available for immediate rendering.

Figure 2:
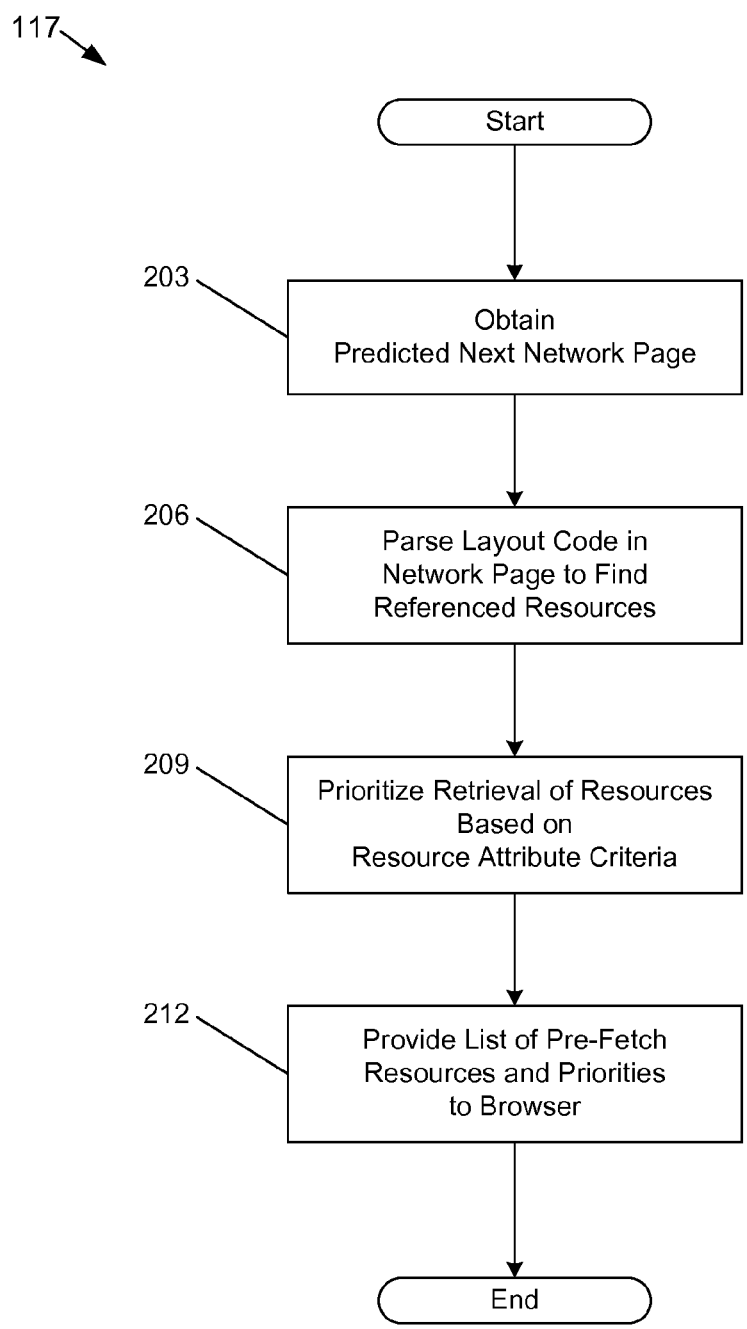
FIG. 2 is a flowchart illustrating an example of functionality implemented as portions of the resource pre-fetch engine in a computing device in the networked environment of FIG. 1 according to various embodiments of the present disclosure.

Turning now to FIG. 2, shown is a flowchart that provides one example of the operation of a portion of the resource pre-fetch engine 115 according to various embodiments. It is understood that the flowchart of FIG. 2 provides merely an example of the many different types of functional arrangements that may be employed to implement the operation of the portion of the resource pre-fetch engine 115 as described herein. As an alternative, the flowchart of FIG. 2 may be viewed as depicting an example of steps of a method implemented in the computing device 103 (FIG. 1) according to one or more embodiments.

Beginning at box 203, the resource pre-fetch engine 115 obtains a network page 133 (FIG. 1) from the page prediction engine 115. This network page 133 is not the page that the user is currently interacting with, but is instead a predicted next page, and, as such, includes partial predicted page data 136. At box 206, the resource pre-fetch engine 115 parses the predicted next network page 133 to find one or more resources 139 (FIG. 1) referenced within the page. These referenced resources 139 may include, for example, various media resources, such as still image files, graphics files, audio files, video files, multimedia files such as Adobe Flash®, or other types of media files. These referenced resources 139 may also include, for example, code or scripts executable by the browser 148, such as, for example, Java code, JavaScript, or other types of code. These resources have various attributes, such as file name, file type, file size, resource type, media type, media version, viewing position of the resource within the network page 133, whether viewing of the resource is triggered by an explicit user action, etc.

At box 209, the resource pre-fetch engine 115 prioritizes the pre-fetch or downloading of the resources 139 identified in box 206. Pre-fetching of the resources is prioritized according to a resource attribute criteria, such that some resources 139 referenced within the predicted next network page 133 are marked for retrieval before others. Various criteria related to resource attributes may be used to determine pre-fetch order. As one example, file size may be used as a criteria, and larger files may be retrieved before smaller files, or smaller files may be retrieved before larger files. As another example, resource type may be used as a criteria, and resource types may have a preferred order, for example: retrieve image resources first; then code resources; then audio resources; then video resources; then multimedia resources. As yet another example, a resource type may be associated with an indicator of how much delay a user expects when viewing or consuming the resource, and the delay indicator may be used as a criteria so that resources for which the user expects little or no delay (e.g., still image) are retrieved ahead of resources for which the user expects significant delay (e.g., video). As still another example, the resource's viewing position within the network page 133 may be used as a criteria, so that resources which are visible earlier in the rendering process (sometimes referred to as "above the fold") are retrieved sooner than resources that are visible later.

Yet another example of a resource attribute criteria is whether rendering of the resource 139 is triggered by an explicit user action, in which case, such resources 139 are prioritized for later retrieval as compared to resources 139 which are rendered without explicit user action. For example, the predicted next network page 133 may be coded so that a user presses a "preview" button in order to view a video file but still images are presented and audio files are played without any button press, in which case the still image(s) and the audio file(s) are retrieved before the video file(s). Another example of a resource triggered by explicit user action may be a code resource such as a script, widget, or other code component.

Still another example of a resource attribute criteria is whether the resource type is one that involves user interaction, so that interactive resources are preferred when pre-fetching. For example, a user control such as a text box or a button may be preferred for pre-fetch, since the user cannot complete the task associated with the network page 133 until he interacts with this resource.

At box 212, having determined a pre-fetch priority for the resources 139, the resource pre-fetch engine provides to the browser 148 a list of the resources 139 to be pre-fetched, along with a link or uniform resource locator (URL) for each resource 139. The list may also include an indication of priority for each resource 139. The process of FIG. 2 is then complete. The browser 148 uses the links to pre-fetch the listed resources 139 before the network page 133 is rendered. In some embodiments, the resources 139 are retrieved by the browser 148 as a low priority task, in background mode, when the browser 148 is otherwise idle, or when the client device 106 is otherwise idle.

In some scenarios all resources 139 selected for pre-fetch may have been successfully retrieved before the rendering of predicted next network page 133 is completed by the browser 148. In other scenarios, only some of the resources 139 selected for pre-fetch may have been retrieved before the rendering of predicted next network page 133. It is also possible that the rendering of predicted next network page 133 occurs before any of the resources 139 selected for pre-fetch were retrieved. It is even possible that the predicted next network page 133 is never rendered because the next page selected by the user for viewing is a page other than the predicted next page.

Figure 3:
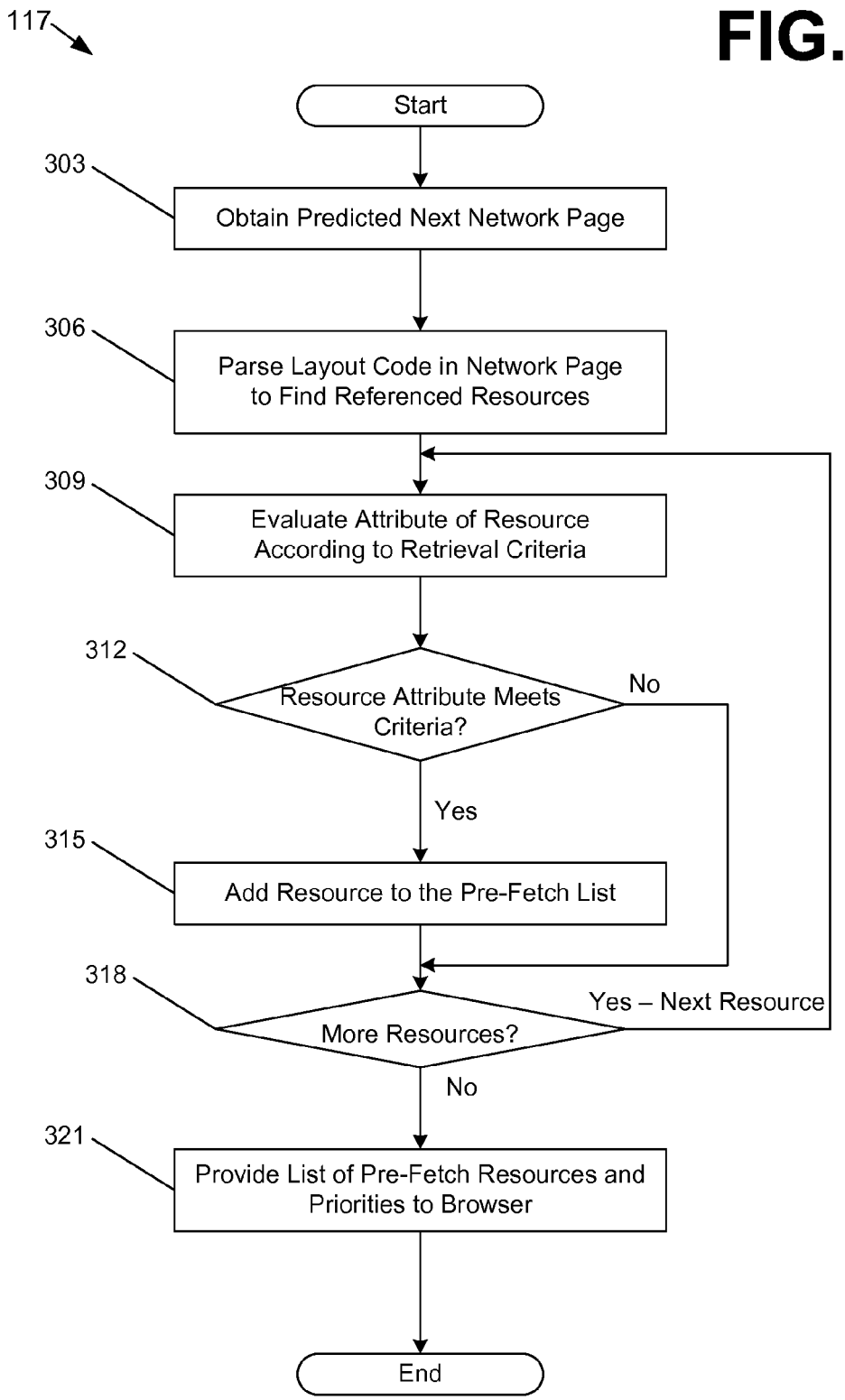
FIG. 3 is a flowchart illustrating an example of functionality implemented as portions of the resource pre-fetch engine in a computing device in the networked environment of FIG. 1 according to various embodiments of the present disclosure.

With reference now to FIG. 3, shown is a flowchart that provides one example of the operation of a portion of the resource pre-fetch engine 115 according to various embodiments. It is understood that the flowchart of FIG. 3 provides merely an example of the many different types of functional arrangements that may be employed to implement the operation of the portion of the resource pre-fetch engine 115 as described herein. As an alternative, the flowchart of FIG. 3 may be viewed as depicting an example of steps of a method implemented in the computing device 103 (FIG. 1) according to one or more embodiments.

Beginning at box 303, the resource pre-fetch engine 115 obtains a network page 133 (FIG. 1) from the page prediction engine 115. This network page 133 is not the page that the user is currently interacting with, but is instead a predicted next page, and as such includes partial predicted page data 136. At box 306, the resource pre-fetch engine 117 parses the predicted next network page 133 to find one or more resources 139 (FIG. 1) referenced within the page. These referenced resources 139 and their attributes were described above in connection with FIG. 2.

At box 309, the resource pre-fetch engine 115 evaluates at least one attribute of one of the referenced resources 139 according to a pre-fetch criteria which is described below. At box 312, the resource pre-fetch engine 115 determines whether the current resource 139 meets the pre-fetch criteria, and if so, adds the current resource 139 to the pre-fetch list at box 315. In some embodiments, the resources 139 are retrieved as a low priority task, in background mode, when the browser 148 is otherwise idle, or when the client device 106 is otherwise idle. At box 318, the resource pre-fetch engine 117 determines whether any more resources 139 on the predicted next network page 133 remain to be processed, and if so, processing continues at box 309, where the attribute of the next resource is evaluated according to the criteria and added to the pre-fetch list if the criteria is met.

If it is determined at box 318 that all resources 139 have been evaluated for pre-fetch, then at box 321, the list of resources to be pre-fetched, along with a link or uniform resource locator (URL) for each resource 139, is provided to the browser 148. The list may also include an indication of priority for each resource 139. The process of FIG. 3 is then complete. The browser 148 uses the links to pre-fetch the listed resources 139 before the network page 133 is rendered. As described above, the rendering is performed when a user action causes the predicted next network page 133 to be the visible, chosen, or current page, so the timing may vary.

Various resource attributes were described above in connection with prioritizing retrieval, and these same attributes may be used as retrieval criteria at box 312 to determine whether or not a particular resource 139 is added to the pre-fetch list. As one example, resources 139 below a maximum size may be retrieved, or resources 139 above a minim size may be retrieved. As another example, resources 139 of certain types may be retrieved while resources 139 of other types are not retrieved. As yet another example, resources 139 immediately visible to the user ("above the fold") may be retrieved while resources 139 not immediately visible to the user are not retrieved.

In some embodiments, the determination made in box 312 to retrieve a set of resources 139 is combined with the prioritizing described in connection with FIG. 2. For example, if the resource attribute criteria is to retrieve resources 139 with a size larger than 256 KB, then the resource pre-fetch engine 117 may further prioritize those resources 139 larger than 256 KB to retrieve in increasing order of size, or to retrieve in decreasing order of size.

The retrieval selection and prioritizing techniques of FIGS. 2 and 3 may be further refined to use capabilities or performance information for the browser 148 and/or the client device 106. As one example, the type and/or version of the browser 148 may be used in selecting or prioritizing resources 139 for retrieval, so that unsupported resource types are not pre-fetched by the resource pre-fetch engine 117. As another example, the speed of the network connection of client device 106 or the current available bandwidth of the network connection may be used in selecting or prioritizing resources 139 for retrieval so that more resources 139 are pre-fetched when more speed or bandwidth is available. As yet another example, the type of processor on the client device 106 and/or the utilization of the processor may be used in selecting or prioritizing resources 139 for pre-fetch. As still another example, the type of client device 106 may be used in selecting or prioritizing resources 139 for pre-fetch. In some embodiments, more resources 139 are pre-fetched for a client device 106 with lesser capabilities. In some embodiments, more resources 139 are pre-fetched for a client device 106 with greater capabilities.

FIGS. 2 and 3 illustrate an embodiment in which the pre-fetching of the resources 139 is performed on the client device 106 device. However, in other embodiments the selection and/or prioritizing of the resources 139 is performed by the network page server application 118, and the resources 139 are "pushed" to the client device 106 rather than "pulled" by the client device 106.

Figure 4:
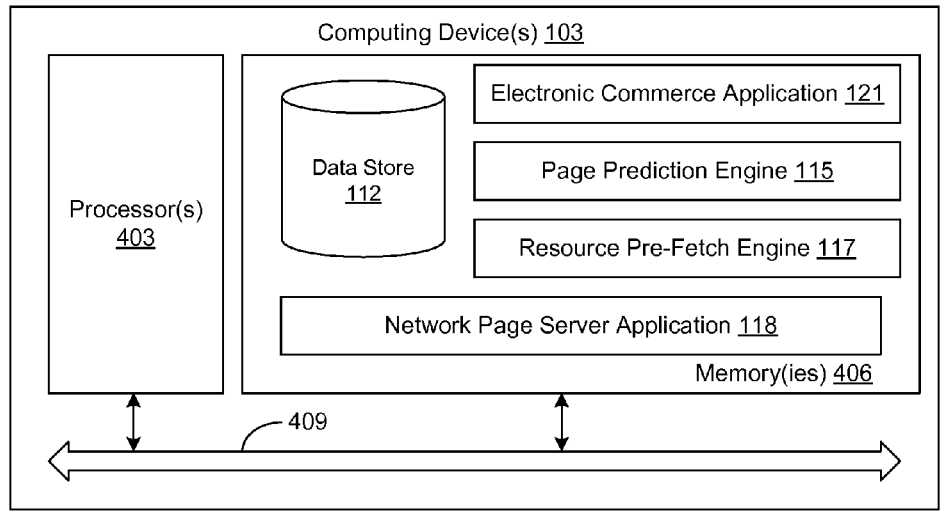
FIG. 4 is a schematic block diagram that provides one example illustration of a computing device 103 employed in the networked environment of FIG. 1 according to various embodiments of the present disclosure.

Moving on to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page server application 118, the page prediction engine 115, the resource pre-fetch engine 117, the electronic commerce application 121, and potentially other applications. Also stored in the memory 406 may be a data store 112 and other data. In addition, an operating system may be stored in the memory 406 and executable by the processor 403.

Figure 5:
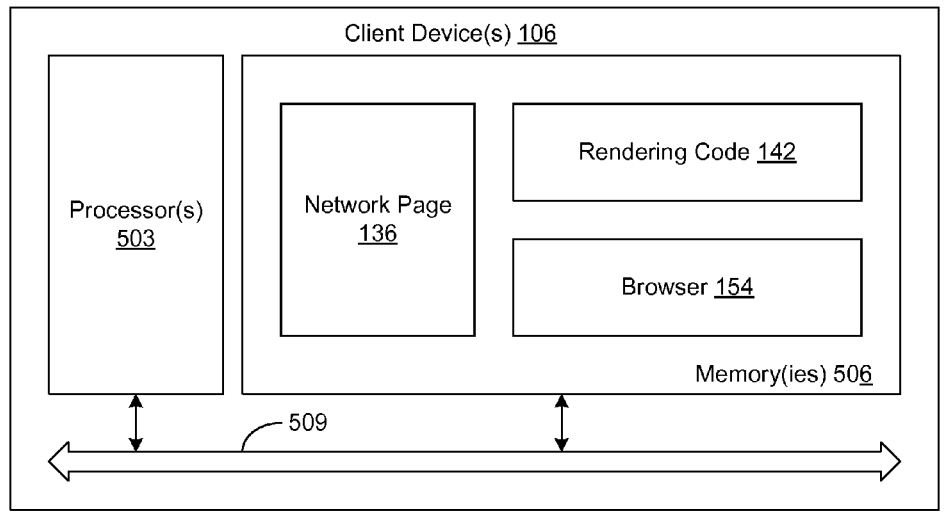
FIG. 5 is a schematic block diagram that provides one example illustration of a client device 106 employed in the networked environment of FIG. 1 according to various embodiments of the present disclosure.

Turning now to FIG. 5, shown is a schematic block diagram of the client device 106 according to an embodiment of the present disclosure. The computing device 106 includes at least one processor circuit, for example, having a processor 503 and a memory 506, both of which are coupled to a local interface 509. To this end, the computing device 106 may comprise, for example, at least one server computer or like device. The local interface 409 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the browser 148, the rendering code 142, and potentially other applications. In addition, an operating system may be stored in the memory 506 and executable by the processor 503.

It is understood that there may be other applications that are stored in the memories 406, 506 and are executable by a respective one of the processors 403, 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memories 406, 506 and are executable by a respective one of the processors 403, 503. In this respect, the term "executable" means a program file that is in a form that can ultimately be run by a respective one of the processors 403, 503. Examples of executable programs may be, for example, a compiled program that can be translated into machine code in a format that can be loaded into a random access portion of the memories 406, 506 and run by a respective one of the processors 403, 503, source code that may be expressed in proper format such as object code that is capable of being loaded into a random access portion of the memories 406, 506 and executed by a respective one of the processors 403, 503, or source code that may be interpreted by another executable program to generate instructions in a random access portion of the memories 406, 506 to be executed by a respective one of the processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406, 506 are defined herein as including both volatile and nonvolatile memory and data storage components. Volatile components are those that do not retain data values upon loss of power. Nonvolatile components are those that retain data upon a loss of power. Thus, the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 403, 503 may represent multiple processors and each of the memories 406, 506 may represent multiple memories that operate in parallel processing circuits, respectively. In such a case, the local interface 409, 509 may be an appropriate network 109 (FIG. 1) that facilitates communication between any two of the multiple processors 403, 503, between any of the processors 403, 503 and any of the memories 406, 506, or between any two of the memories 406, 506, etc. The local interface 409, 509 may comprise additional systems designed to coordinate this communication, including, for example, performing load balancing. Each of the processors 403, 503 may be of electrical or of some other available construction.

Although the network page server application 118, the electronic commerce application 121, the page prediction engine 115, the browser 148, the resource pre-fetch engine 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 & 5 show the functionality and operation of an implementation of portions of the resource pre-fetch engine 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 403, 503 in a computer system or other system. The machine code may be converted from the source code, etc. If embodied in hardware, each block may represent a circuit or a number of interconnected circuits to implement the specified logical function(s).

Although the flowcharts of FIGS. 4 & 5 show a specific order of execution, it is understood that the order of execution may differ from that which is depicted. For example, the order of execution of two or more blocks may be scrambled relative to the order shown. Also, two or more blocks shown in succession in flowcharts of FIGS. 4 & 5 may be executed concurrently or with partial concurrence. Further, in some embodiments, one or more of the blocks shown in FIGS. 4 & 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server application 118, the electronic commerce application 121, the page prediction engine 115, the browser 148, the resource pre-fetch engine 117, that comprises software or code can be embodied in any non-transitory computer-readable medium for use by or in connection with an instruction execution system such as, for example, one of the processors 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to:
   identify a predicted next network page that is predicted to be accessed by a user in a browser;
   obtain the predicted next network page, the predicted next network page referencing a plurality of resources within the predicted next network page;
   determine a prioritization for the resources for a retrieval according to a position of a respective one of the resources in the predicted next network page, wherein a first portion of the resources having a likelihood of being visible in an initial rendering of the predicted next network page have a higher priority for retrieval than a second portion of the resources;
   provide to the browser a list of the resources in order of the prioritization to initiate the retrieval of the resources by the browser according to the prioritization;
   receive a user selection indicating the predicted next network page has been requested by the user in the browser; and
   provide the predicted next network page to the browser in response to the user selection to be rendered in the browser for display, wherein the list is provided to the browser before the predicted next network page.

2. The non-transitory computer readable medium of claim 1, wherein obtaining the predicted next network page is performed in a background mode of the browser.

3. The non-transitory computer readable medium of claim 1, wherein, when executed, the program further causes the computing device to rank the resources according to an available bandwidth of a network connection used by the browser in obtaining the predicted next network page.

4. The non-transitory computer readable medium of claim 1, wherein determining the prioritization for the resources further comprises:
   identifying individual ones of the resources that are interactive so as to be capable of interaction with the user in the browser; and
   associating the individual ones of the resources that are interactive with a higher priority for the retrieval.

5. A method comprising:
obtaining, by a computing device, a predicted next network page, the predicted next network page referencing at least one resource having at least one attribute;
associating, by the computing device, a type of the at least one resource with an indicator indicating a delay a user expects when downloading the at least one resource;
generating, by the computing device, a retrieval list including the at least one resource if the at least one attribute meets pre-fetch criteria, wherein the retrieval list includes the at least one resource when the indicator indicates the user does not expect delay in downloading the type of the at least one resource
determining, by the computing device, a prioritization for the at least one resource in the retrieval list according to a position of the at least one resource in the predicted next network page, wherein the at least one resource has a higher priority for a retrieval than a second resource responsive to the at least one resource being visible in an initial rendering of the predicted next network page;
providing, by the computing device, to a browser the retrieval list comprising the at least one resource according to the prioritization to initiate the retrieval of the at least one resource by the browser according to the prioritization;
receiving, by the computing device, a user selection indicating the predicted next network page has been requested by the user in the browser; and
providing, by the computing device, the predicted next network page to the browser in response to the user selection to be rendered in the browser for display, wherein the retrieval list is provided to the browser before the predicted next network page.

6. The method of claim 5, wherein the at least one attribute comprises a size of the at least one resource.

7. The method of claim 5, wherein the retrieval list includes the at least one resource when no user action is necessary to trigger visibility of the at least one resource.

8. The method of claim 5, wherein the at least one attribute comprises a position of the at least one resource within the predicted next network page.

9. The method of claim 8, wherein the retrieval list includes the at least one resource when the position of the at least one resource is such that the at least one resource is visible without user interaction.

10. The method of claim 5, wherein the retrieval list includes the at least one resource when a network connection of the computing device has a bandwidth that meets a threshold.

11. The method of claim 5, wherein a retrieval of the retrieval list by the computing device is configured to be performed in a background mode of a client device.

12. The method of claim 5, wherein the retrieval list includes the at least one resource when the at least one resource involves user interaction.

13. The method of claim 5, wherein the retrieval list includes the at least one resource responsive to the at least one resource being identified as an interactive resource, wherein the interactive resource is capable of interaction with the user.

14. A system, comprising:
at least one computing device; and
a resource pre-fetch application implemented in the at least one computing device, the resource pre-fetch application comprising:
logic that obtains a predicted next network page, the predicted next network page referencing a plurality of resources, individual ones of the resources having at least one attribute;
logic that determines a prioritization for the resources for a retrieval according to criteria comprising at least a position of a respective one of the resources in the predicted next network page and a resource type, wherein a first portion of the resources having a likelihood of being visible in an initial rendering of the predicted next network page have a higher priority for retrieval than a second portion of the resources;
logic that provides to a browser a pre-fetch list of the resources in order of the prioritization to initiate the retrieval of the resources by the browser according to the prioritization;
logic that receives a user selection indicating the predicted next network page has been requested by the user in the browser; and
logic that provides the predicted next network page to the browser in response to the user selection to be rendered in the browser for display, wherein the list is provided to the browser before the predicted next network page.

15. The system of claim 14, wherein the resource type is selected from a group consisting of image, audio, video, and code.

16. The system of claim 15, wherein the logic that prioritizes is configured to assign priorities, from highest to lowest, to image, audio, and video.

17. The system of claim 14, wherein the criteria further comprises a resource size.

18. The system of claim 17, wherein logic that prioritizes is configured to assign a highest priority to a smallest resource.

19. The system of claim 17, wherein logic that prioritizes is configured to assign a highest priority to a largest resource.

20. The system of claim 14, wherein the individual ones of the resources have at least one additional attribute, and the criteria further involves the at least one additional attribute, and the logic that prioritizes utilizing a plurality of weights for the attributes.

21. The system of claim 14, wherein the pre-fetch list includes individual ones of the resources responsive to the individual ones of the resources being identified as an interactive resource, wherein the interactive resource is capable of interaction with a user in a client application.

* * * * *